July 9, 1968
E. N. WRENSHALL
3,391,554
VALVE LOCKS
Filed May 16, 1966
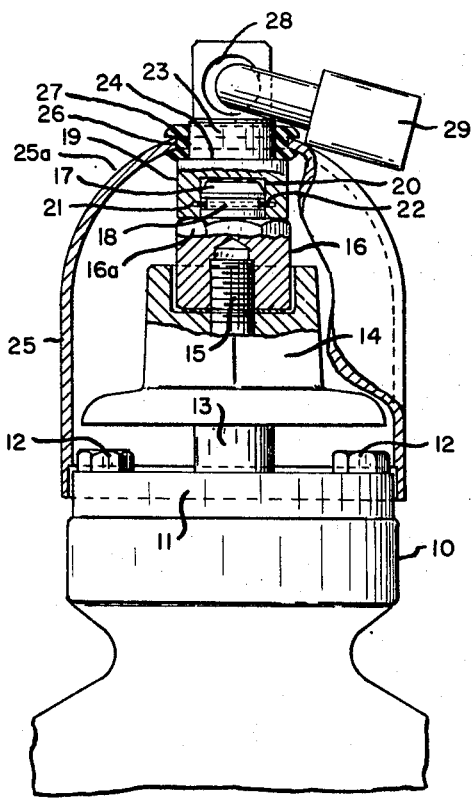
INVENTOR
Edward N. Wrenshall
his attorneys

3,391,554
VALVE LOCKS
Edward N. Wrenshall, Ross Township, Allegheny County, Pa., assignor, by mesne assignments, to Kerotest Manufacturing Corp., Pittsburgh, Pa., a corporation of Pennsylvania
Filed May 16, 1966, Ser. No. 550,499
5 Claims. (Cl. 70—178)

ABSTRACT OF THE DISCLOSURE

A locking device for a valve having a threaded operating stem with an operating square nonrotatably positioned on the stem. A cap nut is positioned in overlying relation with the operating square and is threadably secured to the stem. The cap nut maintains the operating square in position on the stem and forms an element of a swivel. A swivel head is rotatably connected to the cap nut and extends upwardly therefrom. A cylindrical cover member is positioned over the swivel head, cap nut, operating square and the valve stem. A portion of the swivel head extends upwardly through an opening in the cover member and a portion of the cover member adjacent the opening rests on the swivel head shoulder portion so that the cover member is supported by the swivel head. A lock member engages the portion of the swivel head that extends beyond the cover member to prevent removal of the cover member and rotation of the operating square.

---

This invention relates to valve locks and particularly to a valve lock for valves having an operator mounted at the top of the stem and held in place by a nut, as for example, non-rising stem gate valves. Many valves are placed in exposed positions which cannot be continually policed and a great deal of trouble is had from non-authorized persons tampering with the valve. Various expedients have been proposed for avoiding this problem. However, there has been no simple locking device capable of accomplishing this purpose. Generally, the valve is designed so that all that is left exposed is the operating square which requires a wrench to operate it. However, persons who wish to tamper with the valve are not prevented from doing so if they have available a wrench of sufficient size to handle the operating square.

The present invention is directed to a locking mechanism which can be adapted to any valve having a stem and an operating square on the stem held in place by a threaded nut on the end of the stem. The locking device of the present invention is simple, relatively inexpensive, completely effective and does not affect the operative structure of the valve in any way. It can be adapted to any existing valve as well as to new valves.

In a preferred form of my invention, I provide in combination with a threaded stem a threaded cap nut member adapted to be threaded onto the threads of the stem, a swivel head member rotatably engaged on said threaded cap nut member, said swivel head member being held on said threaded cap nut by annular locking means, a shoulder on the swivel head member, a generally cylindrical cover member open at one end to fit over the head of the valve, the threaded cap, and closed at the other end except for an axial opening engaging the shoulder on the swivel head member with the end of the swivel head above the shoulders extending through the opening in the end of the cover member, a passage through the end of the swivel head member extending through the cover member and removable lock means engaged in the passage in the swivel head member.

Preferably a rubber grommet is inserted on the shoulder between the opening in the cover member and the swivel head member to provide a weather-proof seal.

In the foregoing general description, I have set out certain objects, purposes and advantages of my invention. Other purposes, objects and advantages will be apparent from the following description and the accompanying drawing illustrating the locking device of my invention in side elevation, partly broken away.

Referring to the drawing, I have illustrated the valve housing 10 having a cap 11 attached to the valve head 10 by cap screws 12. An operating stem 13 extends through the cap 11 and is provided with an operating square 14 and a threaded end portion 15 adapted to receive a nut for holding the operating square 14 in place. A threaded cap nut member 16 having tightening lands 16a thereon is threaded onto the threaded stem portion 15. The threaded cap nut member 16 is provided with an axially extending stud 17 having an annular groove 18 between the end of the stud and the body of the threaded cap nut member 16. A swivel head member 19 is provided with an axial recess 20 adapted to fit over the stud 17. The recess 20 is provided with an annular groove 21 lying in the plane of the groove 18 of the stud 17. A locking ring 22 is inserted in groove 21 to lie between the groove 21 and groove 18 to hold the swivel head 19 on the threaded cap nut 16 so that it can be swiveled but not removed. The swivel head 19 is provided with an axially extending reduced portion 23 extending beyond a shoulder 24. A cover member 25 of generally cylindrical form having a hemispherical end 25a is provided with an opening 26 adapted to fit over the reduced end portion 23 and rest on the shoulder 24. A resilient sealing member 27 is fitted in the opening 26 to bear against the end member 23 in sealing relation. An opening 28 is formed in the end of the member 23 beyond the shoulder to receive a lock 29 to hold the cover member 25 against removal.

The operation of the device of my invention is believed to be clear from the foregoing description and illustration. It will be noted that the device is simple in operation and can be adapted to any valve having a straight threaded stem. When placed in position, it completely protects the operative stem against vandals and overcomes the problem which has faced the art in this respect.

While I have illustrated and described a preferred embodiment of my invention, it will be understood that this invention may be otherwise embodied within the scope of the following claims.

I claim:

1. In combination with a valve having a housing, a threaded operating stem extending out of said housing and an operating square non-rotatably positioned on the operating stem, a valve lock comprising a threaded cap nut adapted to be threaded onto the threaded stem and maintain said operating square in position on said threaded operating stem, said cap nut forming an element of a swivel, a second element of a swivel comprising a swivel head member rotatably engaged on said threaded cap nut member, means between said cap nut member and swivel head member holding said swivel head against removal, shoulder means on the swivel head member, said swivel head member having an axially extending end portion extending beyond said shoulder, a generally cylindrical cover member open at one end to fit over the swivel head member, the cap nut member, the operating nut and the valve stem, said cover member closed at the other end except for an axial opening slidable on the axially extending end portion and bearing on said shoulder, and removable lock means engaging the axially extending end portion of said swivel head member whereby removal of the cover member and rotation of the operating square are prevented.

2. A valve lock as claimed in claim 1 wherein the lock means is a padlock passing through an opening in the axially extending end.

3. A valve lock as claimed in claim 1 wherein the means between the cap nut and swivel head holding the swivel head against removal is a spring lock ring lying in corresponding annular grooves in each of the cap nut and swivel head.

4. A valve lock as claimed in claim 1 wherein the axial opening in the cover member is provided with a resilient elastomer grommet sealingly engaging the axially extending end of the swivel head to provide a weather seal.

5. A valve lock as claimed in claim 1 wherein the cap nut is provided with an axially extending stud portion and the swivel head with an axial recess fitting over said stud, corresponding annular recesses in the peripheral surfaces of each of said stud and recess and lock ring means loosely fitting in each of said recesses between the cap nut and swivel head to prevent their being separated.

References Cited

UNITED STATES PATENTS

| | | | |
|---|---|---|---|
| 1,599,685 | 9/1926 | Spaeth | 70—164 XR |
| 1,604,690 | 10/1926 | Halaby | 70—232 XR |
| 2,162,309 | 6/1939 | Junghans | 16—2 |
| 2,534,446 | 12/1950 | Howard | 70—231 |

FOREIGN PATENTS 86,945  1/1922  Austria.

MARVIN A. CHAMPION, *Primary Examiner.*
ROBERT L. WOLFE, *Assistant Examiner.*